March 16, 1948. H. DREYFUS 2,437,686
PROCESS FOR THE EXTRUSION OF FUSED ARTIFICIAL MATERIALS
Filed Nov. 29, 1944 2 Sheets-Sheet 1
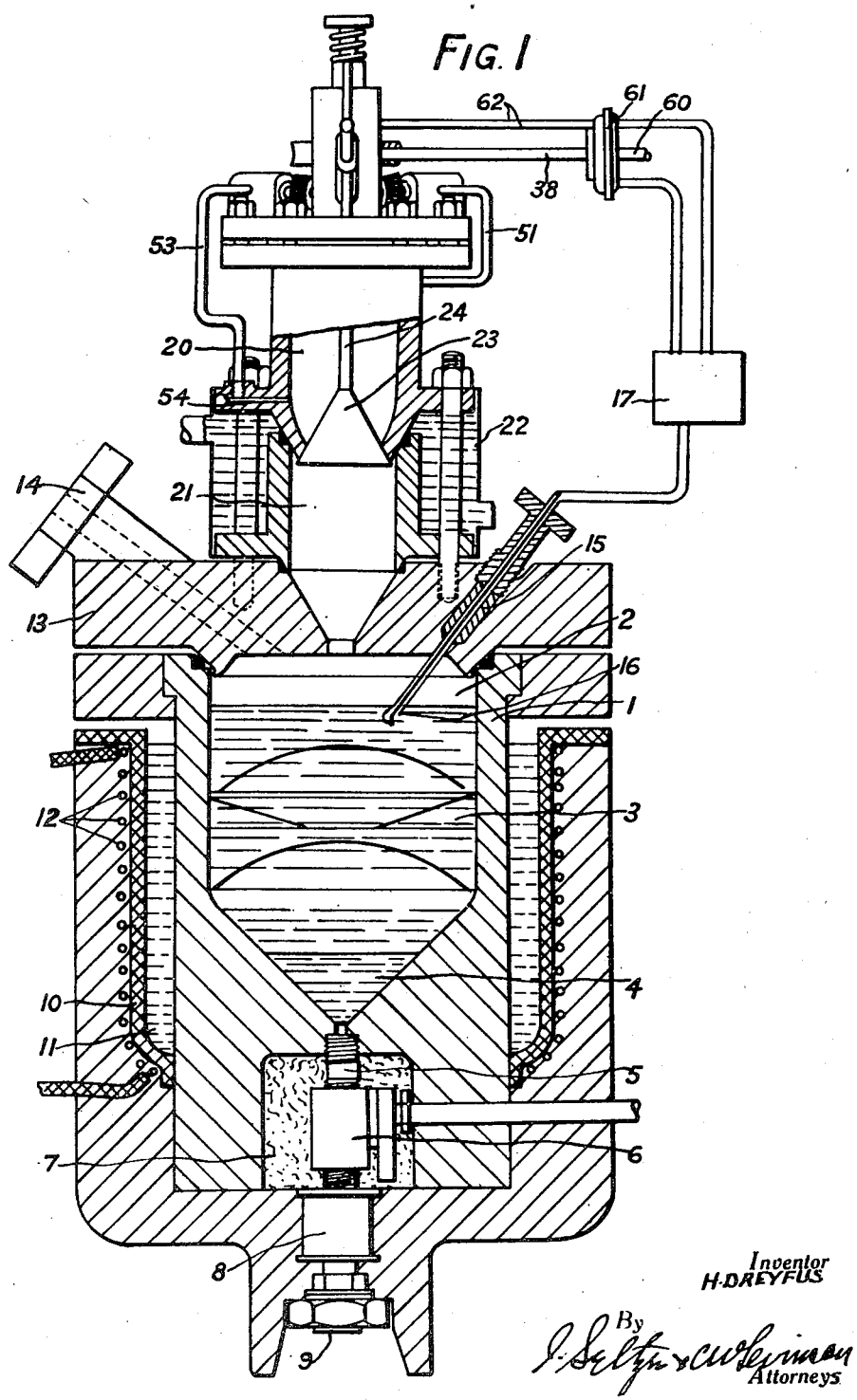
Inventor
H. DREYFUS

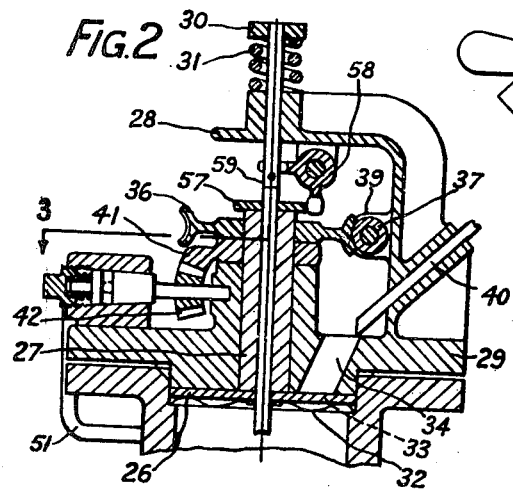
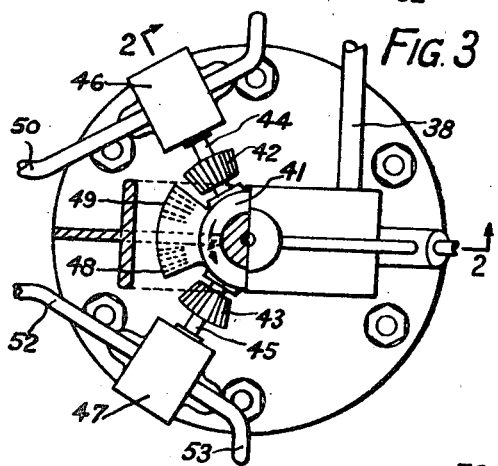
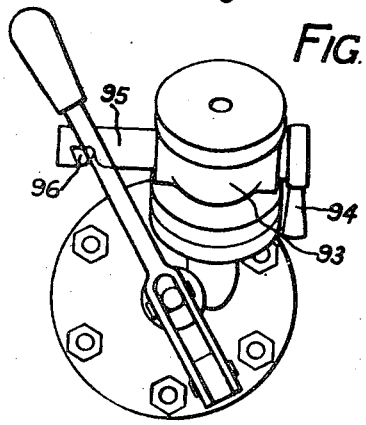
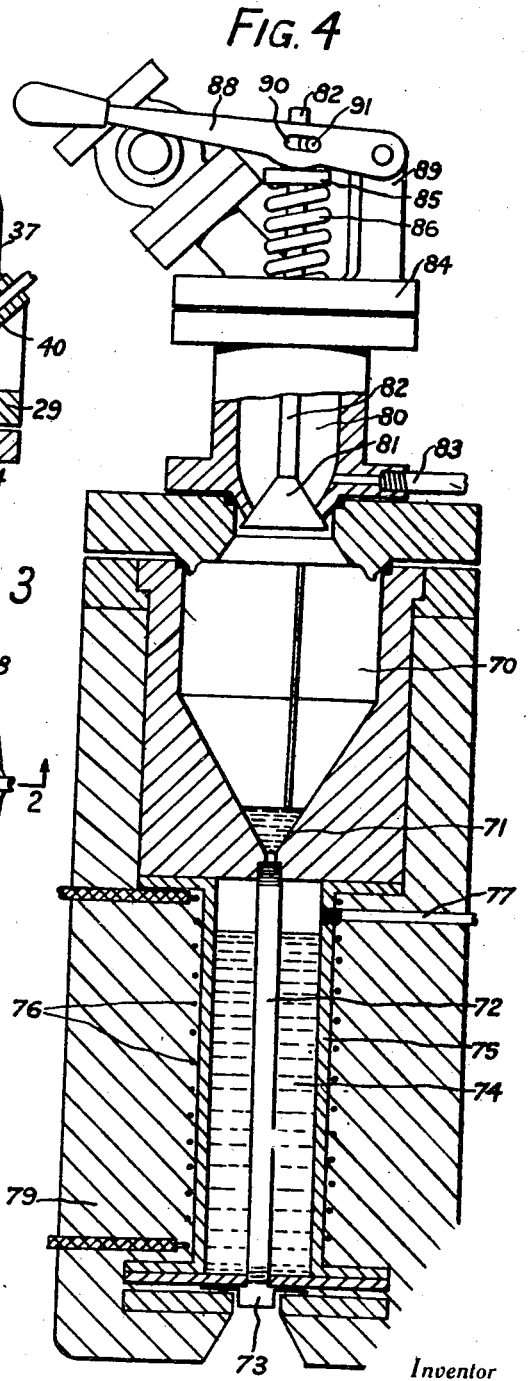

Patented Mar. 16, 1948

2,437,686

UNITED STATES PATENT OFFICE 2,437,686

PROCESS FOR THE EXTRUSION OF FUSED ARTIFICIAL MATERIALS

Henry Dreyfus, London, England; Claude Bonard, administrator of said Henry Dreyfus, deceased, assignor to Celanese Corporation of America, a corporation of Delaware Application November 29, 1944, Serial No. 565,711
In Great Britain November 24, 1943

Section 1, Public Law 690, August 8, 1946
Patent expires November 24, 1963

4 Claims. (Cl. 18—54)

This invention relates to the production of artificial filaments, foils, films and like materials and particularly to the production of artificial materials by the extrusion of fused thermoplastic compositions.

In one method of extruding fused thermoplastic compositions to form artificial filaments, foils, films and the like, a charge of the thermoplastic composition contained in a substantially closed vessel is extruded therefrom through orifices of suitable form. In order to prevent decomposition of the composition, it is often necessary to maintain in the vessel an atmosphere of inert gas, which may be under pressure so as to bring about the extrusion of the molten composition, or to assist such extrusion where pumps or the like are provided for the purpose of extruding the composition. On exhaustion of the charge contained in the vessel, extrusion ceases and the vessel is re-filled with a fresh charge which is then extruded in the same manner and so on. The size of the charge which may be employed in this manner is limited, having regard to the cross-section of the extruded products, by the time for which the thermoplastic material may be maintained at the temperature necessary for fusion and extrusion. The melting points of thermoplastic composition suitable for the purpose of extrusion are frequently in the neighbourhood of the point at which the decomposition of the materials take place and, under working conditions, slow decomposition of the material limits the time that may be spent in the extrusion of a single charge.

It has now been found that in order to effect the extrusion of a thermoplastic composition as a continuous operation, the supply of composition can be maintained in the vessel in which it is fused for extrusion by introducing solid composition into the vessel at intervals through a lock chamber capable of being closed to the vessel while open to the outer air for the charging of the lock chamber with solid composition, of being closed after charging while its atmosphere is brought substantially to the condition of that within the vessel, e. g. as regards its pressure or composition or both, and of being opened to the vessel while closed to the outer air for feeding the charge of solid composition to the vessel. By these means fresh thermoplastic composition is introduced into the vessel without intrrupting the melting of the composition or the extrusion thereof, and the process may thus proceed continuously and indefinitely. The size of the vessel, instead of being made as large as possible having regard to the rate of extrusion and the time for which the fused composition may be held therein without decomposition, is controlled merely by the necessity of ensuring that the composition remains in the vessel long enough to be fused preparatory to being extruded.

The invention is of particular advantage where an inert atmosphere is to be maintained within the vessel, and especially an inert atmosphere under high or moderate pressure to effect or to assist in effecting the extrusion of the fused composition.

For carrying out the invention, there is provided a lock chamber in connection with the vessel, valves between said chamber and the atmosphere and between said chamber and the vessel, and connections for the supply of inert gas to said chamber to bring its atmosphere to substantially the same condition as that within the vessel. The valve communicating with the vessel is preferably of the self-sealing type, e. g. a cone fitting on a conical seat and pointing outwards from the vessel to the lock chamber. The valve is preferably positively operated by suitable means from outside the lock chamber. Connections may be provided between the valve and the closure for the inlet to the lock chamber to ensure that one cannot be opened until the other is shut, and like means may be provided between the closure and the valve controlling the supply of inert gas under pressure. In order to prevent premature melting of the composition, which might hinder its passage from the lock chamber to the vessel, the lock may be cooled, e. g. by means of a water jacket so as to counteract the effect of heat conduction from the vessel to the lock. The supply of solid composition may be in the form of suitably shaped pellets or small pieces of uniform size. Alternatively, it may be in the form of a powder, or fine grains, in order to facilitate melting of the composition. In this case, it is generally desirable to remove from the fresh composition any free atmospheric oxygen carried with it. This may most conveniently be done in the lock immediately before the introduction of the composition into the vessel. For this purpose, the lock may be flushed by a current of inert gas through the lock so as to displace the oxygen carried with the composition (and also that contained in the atmosphere of the lock) or, alternatively or in addition, the lock may be exhausted by means of an air pump or by being connected to a vacuum main after being closed to the atmosphere and before being put under pressure perparatory to being opened to the vessel.

The operation of the lock for the purpose of feeding a fresh charge of composition to the vessel may be effected manually on a visual indication that fresh composition is required in the vessel, or suitable mechanism may be provided for operating the lock automatically in accordance with a mechanical or electrical indication from within the vessel.

When the extrusion of the fused composition is effected by the pressure of an atmosphere of inert gas maintained within the vessel, the final control of the temperature of the composition at the point of extrusion may be effected by causing the composition to pass from the vessel to the point of extrusion through a heated narrow tube in the manner described in U. S. application S. No. 375,762, filed January 24, 1941, now abandoned. The various means employed for heating the vessel and the tube described in that specification may be employed also for the purposes of the present invention.

When pumps are used to extrude the fused composition, however, it is preferable to use other means for effecting the melting and final control of the temperature of the composition. Thus, melting may be effected by means of a heated melting liquid in which the solid composition is immersed in the manner described in U. S. application S. No. 522,458, filed February 15, 1944. The temperature to which the composition must be heated before extrusion will depend largely on the nature of the composition itself. In general, however, temperatures of the order of 200–250 up to 290 or 300° C. are desirable, particularly when employing compositions having a basis of superpolymers formed, for example, by the self-condensation of amino-carboxylic acids or by the condensation of diamines with dicarboxylic acids.

The pressure necessary for extrusion will depend upon the fluidity of the fused material, which will vary with the nature of the composition and the temperature to which it is heated, and upon the area of cross-section of the extrusion orifices. Extrusion orifices for filament formation may have a diameter of, for example, about 0.2 mm. up to 1.0–1.5 mm. or more, according to requirements. When it is desired to produce bristles, orifice diameters as large as 2 mm. or more may be employed. Preferably 5, 10, 15 or more orifices are provided in a single spinneret plate, these being grouped together near the center of the plate or arranged in a circle about the center of the plate so that there is no substantial variation between the pressure acting to force the composition through the various orifices.

It is generally advantageous to draw down the extruded materials to a substantial extent by winding up, for example, at a rate of 5, 20, 50, 100 or even more times the rate of extrusion.

By way of example two forms of apparatus according to the invention will now be described in greater detail with reference to the accompanying drawings in which:

Fig. 1 is an elevation largely in section of a melt-spinning apparatus furnished with an automatic feeding means according to the invention, Fig. 2 is an elevation of the feeding means shown in Fig. 1 on the line 2—2 of Fig. 3, Fig. 3 is a plan partly in section on the line 3—3 of Fig. 2, Fig. 4 is an elevation largely in section of a further form of melt-spinning apparatus provided with a hand operated means in accordance with the invention, and Fig. 5 is a plan of the feeding apparatus shown in Fig. 4.

The melt-spinning apparatus shown in Fig. 1 comprises a steel vessel 1 in which is formed a melting chamber 2 containing an inert liquid 3 by means of which the composition to be spun is melted, the molten composition forming a pool 4 at the bottom of the chamber 2. The composition passes from the pool 4 by a passage 5 to a spinning pump 6 in a cavity 7 in the bottom of the vessel 1, the cavity being packed with copper turnings to provide, in conjunction with the solid metal of the vessel 1, a reservoir of high heat capacity in the neighborhood of the pump 6. The pump forces the composition through a filter 8 to a spinning jet 9 from which the composition emerges in the form of the filaments.

The vessel 1 is surrounded by a jacket 10 containing a liquid heating medium 11, the jacket being heated by means of heating coils 12. The chamber 2 is closed by a heavy cover 13 provided with a passage 14 to which nitrogen or other inert gas under high pressure is supplied to the chamber, the back pressure thus applied to the inlet of the pump 6 assisting the pump in extruding the composition at a uniform rate. Entering the chamber 2 through a gland 15 in the cover 13 is a thermocouple element 16 whose two junctions are disposed, one slightly higher than the other, so that when both junctions are submerged in the liquid 3 they are at the same temperature, while if the level of the liquid 3 falls below that of the upper junction, they are at different temperatures. The thermocouple element is connected to a relay 17 for a purpose hereinafter described.

The composition to be extruded enters the chamber 2 through a lock chamber 20 by way of an intermediate chamber 21 provided with a jacket 22 through which a cooling liquid is circulated, so as to prevent the heat of the vessel 1 from being communicated to the lock chamber 20. At the bottom of the lock chamber is a conical valve 23 carried on a stem 24 by means of which the chamber 20 may be opened to the intermediate chamber 21. The mechanism for this purpose is shown in external elevation in Fig. 1 and in sectional elevation and plan in Figs. 2 and 3.

As shown in Fig. 2 the valve stem 24 emerges from the chamber 20 by passing through a disc 26, a hollow shaft 27 and a bridge member 28 that is formed integral with the cover 29 of the chamber 20. A disc 30, secured to the top of the valve stem 24, is forced upward by means of a strong spring 31 which keeps the valve shut. The disc 26 is pressed upwards against the cover 29 by means of the spring 32 and is provided with a port, indicated at 33 which, by rotation of the disc 26, may be brought into coincidence with a port 34 through the thickness of the cover 29. The disc 26 is secured to the hollow shaft 27, which is rotated so as to open the passage 33, 34, by means of a worm gear 36 driven by means of a worm 37 carried on a shaft 38 journalled in bearings 39 on the bridge 28. When the rotation of the shaft 27 brings the hole 33 in alignment with 34, a measured charge of the composition to be spun is introduced from a known type of dispensing device (not shown) by way of the passage 40. The continued rotation of the shaft 27 then closes the inlet 33, 34.

The shaft 27 also carries the interrupted bevel gear 41 adapted to engage in succession bevel gears 42, 43, fixed to the shafts 44, 45 of two plug valves 46, 47. The teeth of the gear 41 are in two groups 48, 49, with a space between the groups, each group rotating the valves 46, 47 through 90°. By these means, each valve is opened, left open for a short time and then closed, the valve 46 being closed before the valve 47 is opened. The valve 46 is connected by means of a pipe 50 to a vacuum main and is connected by a pipe 51 to the upper part of the chamber 20. The valve 47 is connected by a pipe 52 to the same source of supply of nitrogen under pressure as the connection 14 by which nitrogen is supplied to the chamber 2. The pipe 53 leaving the valve 47 enters the lower part of the chamber 20 through a passage 54 passing through the lower flange thereof.

At the top of the hollow shaft 27 is a cam 57 which, after the valve 46 has been closed, actuates a bell crank lever 58 whose other end works on a pin 59 carried on the valve stem 24. The upper part of the valve stem 24, where it passes through the bridge 29, is of square section so as to prevent the stem 24 rotating with the hollow shaft 27. The shaft 38 is driven from a constantly rotating shaft 60 by means of an electrically operated clutch 61 connected to the relay 17. The relay 17 is also connected by leads 62 to a switch (not shown) which is operated by the cam 57 after the shaft 27 has performed one revolution. The operation of the device is as follows:

The consumption of the molten polymer in the pool 4 by the act of spinning causes the level of the heating liquid 3 to fall. In due course the upper junction of the thermocouple 16 is uncovered and since the atmosphere above the liquid 3 is at a lower temperature than the liquid itself (as described in U. S. application S. No. 566,900, filed December 6, 1945, now abandoned, corresponding to British application No. 19,648/43) there is an electromotive force generated by the thermocouple element 16. This is transmitted to the relay 17 which thereupon puts into operation the clutch 61. In this way the shaft 38, worm 37 and worm gear 36 are driven and the shaft 27 and disc 24 are rotated. In due course the hole 33 is brought into alignment with hole 34 and a charge of powdered composition is entered through the passage 40 into the lock chamber 20. As the shaft 27 continues to rotate the holes 33, 34 are brought out of coincidence, and the chamber 20 is sealed.

Continued rotation of the shaft 27 brings the gear 41 into engagement with gear 42 whereby the plug valve 46 is rotated through 90° and opened. It remains open long enough for the atmosphere in the chamber 20 to be evacuated to the vacuum main whereby any oxygen entering the chamber 20 with the charge of composition is removed. The segment of gear 49 on the gear 41 then rotates the gear 42 through a further 90° and closes the valve 46. The valve 47 is then opened in a similar manner and nitrogen under high pressure is admitted to the chamber 20 which is thus brought to the same pressure as that in the chamber 2.

The cam 57 then actuates the lever 58 which presses down the pins 59 and opens the valve 23, allowing the charge of composition in the chamber 20 to pass through the chamber 21 and into the chamber 2. Meanwhile, either before or after the opening of the valve 23, the valve 47 is shut. The cam 57 allows the valve 23 to shut also, under the action of the spring 31. The switch connecting the leads 62 of the relay is then operated by the cam 57 and the relay is reset, disengaging the clutch 61. The charge of composition thus introduced raises the level of the liquid 3 so that the upper junction of the thermocouple 16 is again submerged. When the level again falls or if it is not raised sufficiently by a single charge of solid composition, the cycle is repeated so that the process of extrusion is able to continue indefinitely.

Figs. 4 and 5 show a form of melt spinning apparatus of the kind described in U. S. application S. No. 375,762, in which the composition is brought to a uniformly fused state by passing to the point of extrusion through a heated narrow tube. The composition is brought to a fused or partly fused state in a vessel 70, forming a pool 71 in the bottom of the vessel. From the pool 71 the composition enters a narrow tube 72, to the lower end of which is secured a spinning jet 73. The tube 72 is surrounded by a heating liquid 74 contained in a jacket 75 provided with heating coils 76. The liquid 74 vapourises and the chamber 70 is heated by the condensation of the vapour in the top of the jacket 75. The current passing through the coil 76 is controlled so as to maintain constant the pressure in the jacket 74 and thereby to keep the temperature constant. A pipe 77 is provided communicating with a pressure gauge and suitable control mechanism for this purpose. The vessel 70, jacket 75 and jet 73 are heavily lagged with insulating material 79. The vessel 70 is supplied with nitrogen under high pressure in a manner similar to that described in Fig. 1 the pressure supplied being sufficient to effect the extrusion of the fused composition through the jet 73. The composition to be spun is introduced to the vessel 70 by way of a lock 80 provided at the bottom with the conical valve 81 actuated by means of its stem 82.

A pipe 83 supplies the lock 80 with nitrogen under the same pressure as that within the vessel 70. The valve stem 82 passes through the cover 84 of the lock 80 and is provided with a disc 85 pressed upwards by means of a strong spring 86 which keeps the valve normally closed. The valve 81 is actuated by means of a lever 88 pivoted on a pillar 89 integral with the cover 84, the lever 88 being forked and formed with slots 90 through which passes a pin 91 secured to the stem 82. The composition to be extruded is introduced in the lock 80 by way of a plug valve 93 manually operated by handle 94. The spindle of the plug valve 93 has an extension 95 at the side opposite to the handle 94, which extension passes under the lever 88 as shown in Fig. 5. An oblique slot 96 is formed in the extension 95 into which, when the valve 93 is shut, the lever 88 may enter so permitting the valve 81 to be opened. When the valve 93 is open, however, the lever 88 is locked by the extension 95 so that the valve 81 cannot be opened. In the arrangement shown, after the composition has been introduced into the chamber 80 the chamber may be flushed by nitrogen entering through the pipe 83 so as to wash out any oxygen entering with the charge of composition. When the valve 93 is shut, the pressure in the chamber 80 builds up until it is equal to that of the chamber 70 whereupon the lever 88 is manually depressed and the charge passes from the lock 80 to the chamber 70. The valve 93 cannot be opened again until the valve 81 is shut.

While reference has been made above to superpolymers formed by condensation of amino-carboxylic acids or of diamines and dicarboxylic acids, other linear superpolymers the main chain of the molecules of which has been synthesised by a condensation reaction, may be converted into shaped artificial materials according to the present invention. Or the compositions employed may have a basis of a polyvinyl compound, e. g. polymerised vinylidene chloride or a copolymer of vinyl chloride with vinyl acetate, or of a polymerised ester of an unsaturated acid, e. g. those of the acrylic and methacrylic acid series. Or again, the invention may be applied to compositions having a basis of thermoplastic cellulose derivatives, as for example cellulose acetate, cellulose propionate, cellulose butyrate, cellulose aceto-propionate, cellulose acetobutyrate, cellulose acetostearate, ethyl cellulose and benzyl cellulose and ether-esters of cellulose. Any suitable effect materials, e. g. pigments, dyes and the like, may be incorporated in the thermoplastic compositions if desired.

Having described my invention, what I desire to secure by Letters Patent is:

1. Process for the production of artificial materials by the extrusion of fused thermoplastic compositions, said process comprising melting the composition in a vessel containing an atmosphere other than air and inert to the composition by contact in said vessel with a liquid heating medium inert to and of lower density than the composition and withdrawing the molten composition from below the surface of said medium in said vessel for extrusion, and maintaining the supply of composition in said vessel by charging solid composition at intervals into a lock chamber that is closed to said vessel, closing said lock chamber and bringing its atmosphere substantially to the composition of that within said vessel, and then opening said lock chamber to said vessel and transferring the charge of solid composition from said lock chamber to the vessel.

2. Process for the production of artificial materials by the extrusion of fused thermoplastic compositions, said process comprising melting the composition in a vessel containing an atmosphere other than air and inert to the composition by contact in said vessel with a liquid heating medium inert to and of lower density than the composition and withdrawing the molten composition from below the surface of said medium in said vessel for extrusion, detecting the temperature at a fixed level within said space and, whenever a sharp temperature drop indicates that the surface of said heating medium has fallen below said level, supplying solid composition to said vessel by charging solid composition into a lock chamber that is closed to said vessel, closing said lock chamber and bringing its atmosphere substantially to the composition of that within said vessel, and then opening said lock chamber to said vessel and transferring the charge of solid composition from said lock chamber to the vessel.

3. Process for the production of artificial materials by the extrusion of fused thermoplastic compositions, said process comprising melting the composition in a vessel by contact in said vessel with a liquid heating medium inert to and of lower density than the composition, supplying to said vessel from a source of supply under pressure an atmosphere of gas other than air and inert to the composition, withdrawing the molten composition from below the surface of said medium in said vessel for extrusion, detecting the temperature at a fixed level within the said vessel and, whenever a sharp temperature drop indicates that the surface of said heating medium has fallen below said level, supplying solid composition to said vessel by charging solid composition at intervals into a lock chamber that is closed to said vessel, sweeping said lock chamber with a current of said gas, closing said lock chamber, connecting it to said source of supply under pressure so as to bring the atmosphere in said lock chamber substantially to the composition and pressure of that within said vessel, and then opening said lock chamber to said vessel and transferring the charge of solid composition from said lock chamber to the vessel, and cooling the lock chamber throughout the melting operation.

4. Process for the production of artificial materials by extrusion of fused thermoplastic compositions, said process comprising melting the composition in a vessel by contact in said vessel with a liquid heating medium inert to and of lower density than the composition, supplying to said vessel from a source of supply under pressure an atmosphere of gas other than air and inert to the composition, withdrawing the molten composition from below the surface of said medium in said vessel for extrusion, detecting the temperature at a fixed level within the said vessel and, whenever a sharp temperature drop indicates that the surface of said heating medium has fallen below said level, supplying solid composition to said vessel by charging solid composition at intervals into a lock chamber that is closed to said vessel, closing said lock chamber, exhausting air from said lock chamber, connecting it to said source of supply under pressure so as to bring the atmosphere in said lock chamber substantially to the composition and pressure of that within said vessel, and then opening said lock chamber to said vessel and transferring the charge of solid composition from said lock chamber to the vessel, and cooling the lock chamber throughout the melting operation.

HENRY DREYFUS.

REFERENCES CITED

The following references are of record in the file of this patent:

UNITED STATES PATENTS

| Number | Name | Date |
| --- | --- | --- |
| 2,177,658 | Kimble et al. | Oct. 31, 1939 |
| 2,207,426 | Bailey | July 9, 1940 |
| 2,243,968 | Lester | June 3, 1941 |
| 2,273,188 | Graves | Feb. 17, 1942 |
| 2,278,875 | Graves | Apr. 7, 1942 |
| 2,369,506 | Weibel | Feb. 13, 1945 |